March 26, 1929.　　　C. JOBST　　　1,706,451
APPARATUS FOR FORMING BRUSHES
Filed Jan. 7. 1922　　　6 Sheets-Sheet 3

March 26, 1929. C. JOBST 1,706,451
APPARATUS FOR FORMING BRUSHES
Filed Jan. 7, 1922 6 Sheets-Sheet 4

Inventor
CONRAD JOBST.

By Whittemore Hulbert Whittemore
attorneys

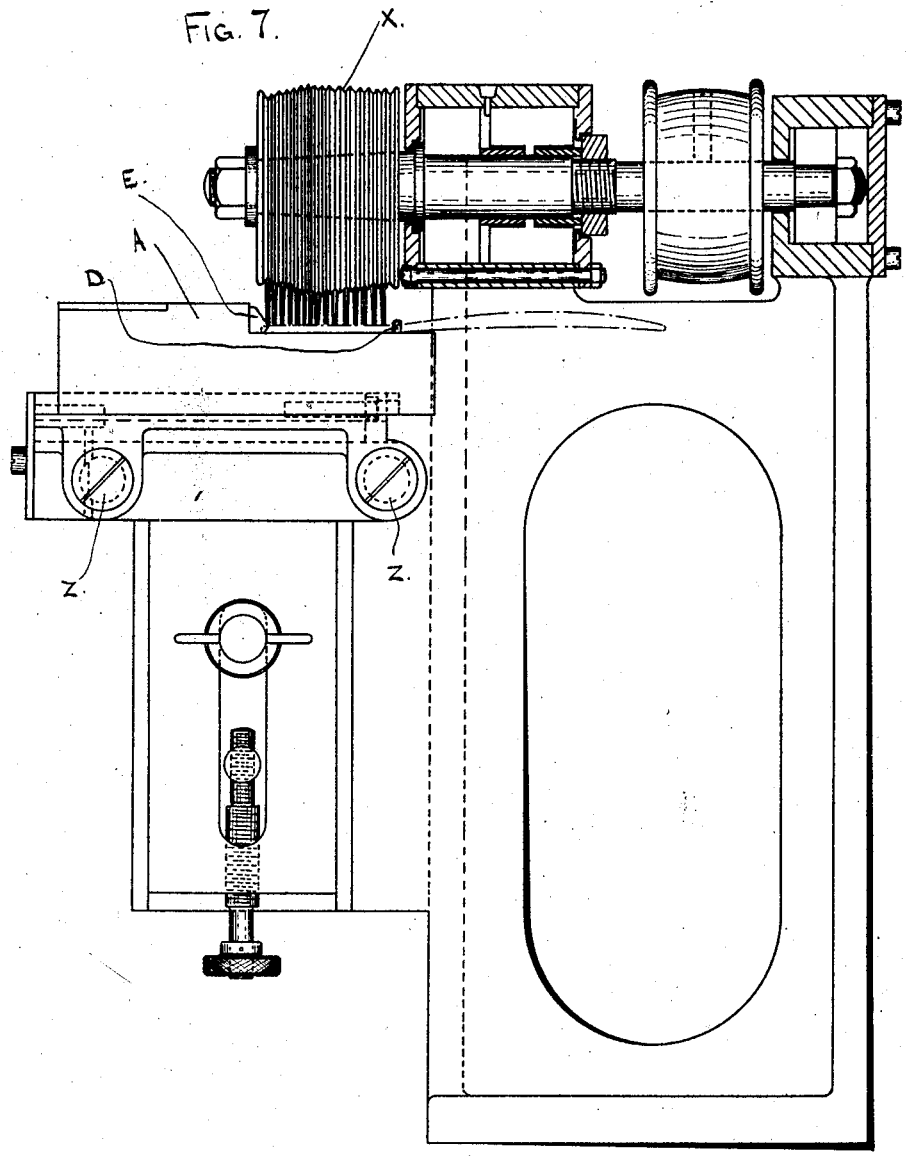

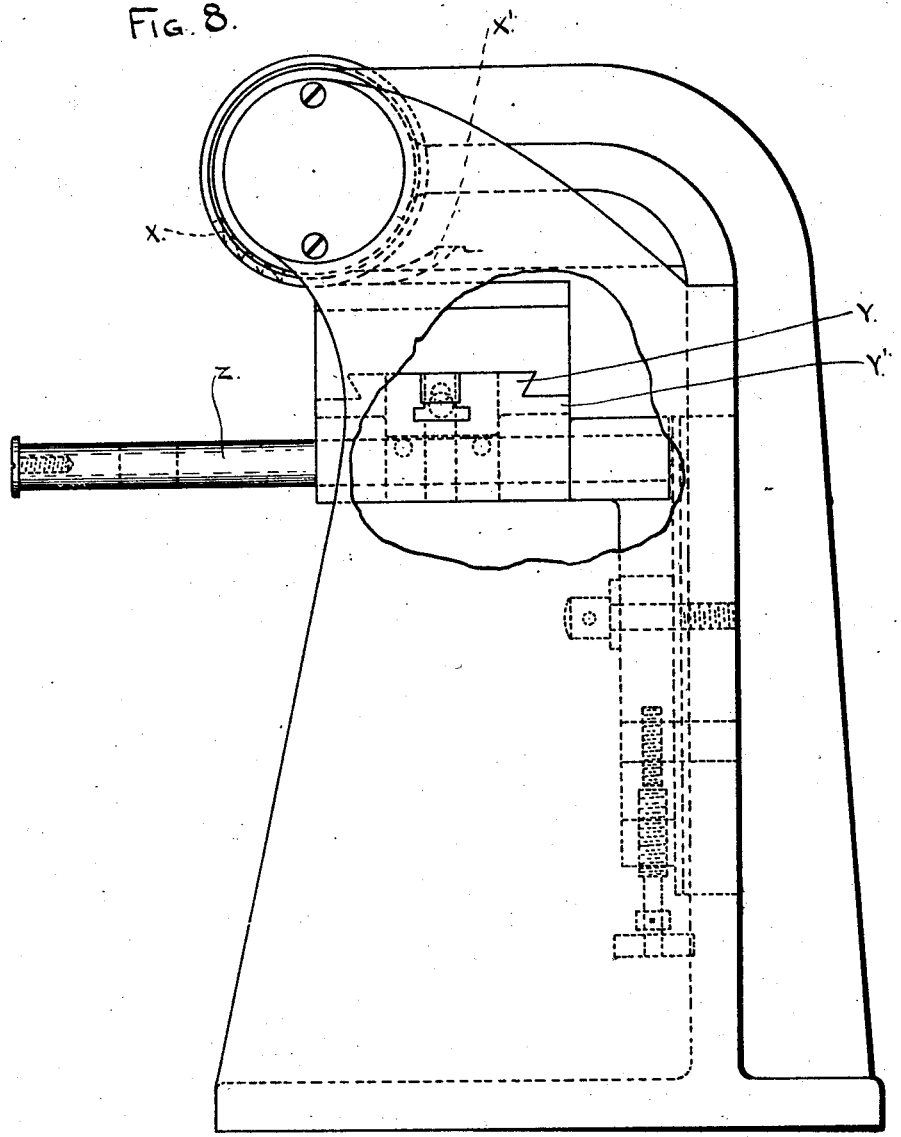

Patented Mar. 26, 1929.

1,706,451

UNITED STATES PATENT OFFICE.

CONRAD JOBST, OF TOLEDO, OHIO, ASSIGNOR, BY MESNE ASSIGNMENTS, TO THE TOLEDO AUTOMATIC BRUSH MACHINE COMPANY, OF TOLEDO, OHIO, A CORPORATION OF OHIO.

APPARATUS FOR FORMING BRUSHES.

Application filed January 7, 1922. Serial No. 527,592.

The invention relates to the apparatus for the manufacture of brushes, being more particularly designed for use in the manufacture of small brushes, such as tooth brushes. It is the object of the invention to increase the rate of production and to also obtain a high grade product and to render the operations to a large degree automatic.

In the present state of the art brushes have been manufactured in automatic machines such as shown in my copending application Serial No. 527,590 filed Jan. 7, 1922, which simultaneously operate to bore the back of one brush while it is setting tufts in a corresponding bored back. With such machines the cycle is determined by the number of tufts in the individual brush and the machine must be stopped to permit of transfer of the bored back and the removal of the finished brush after each cycle. Furthermore, a considerable portion of the time is occupied in the transferring of the backs and removal of the completed brushes so that the rate of production is not high.

To overcome the objections above referred to I have changed the method of manufacture by dispensing with the stopping and starting of the machine for each individual brush and by handling the brushes in gangs or groups. This requires the original mounting of the brush backs in a gang or group holder and the maintaining of the backs in this relation during all of the subsequent operations such as boring, tuft setting, trimming, etc. The result of the change is: first, to increase the accuracy of the work by securing more exact registration in each of the several operations; second, to very greatly increase the speed of production as the machine is only stopped after the completion of the entire group, while the time occupied in transferring of the group holders is less than required for the transfer and proper registration of an individual brush back. Other specific advantages of my improved method and machine will be referred to hereinafter.

In the drawings:

Figure 7 is a front elevation of the brush trimming machine;

Figure 8 is an end elevation thereof.

The apparatus as specifically shown is designed for the manufacture of tooth brushes in which the backs and handles are integral. It is usual to form the handle with a contracted portion adjacent to the back, forming a rounded shoulder, while the outer end of the back is merely rounded. This does not give well defined bearing surfaces for engagement with the work holder, so that if a brush, after being once clamped in the holder, should be transferred to another clamp, exact registration would be difficult. However, with my improved method the brush backs once engaged with the holder are not removed therefrom until the brush is entirely completed and the holders themselves are so fashioned that they may be exactly positioned in the machine with which they are successively engaged.

Figure 4:
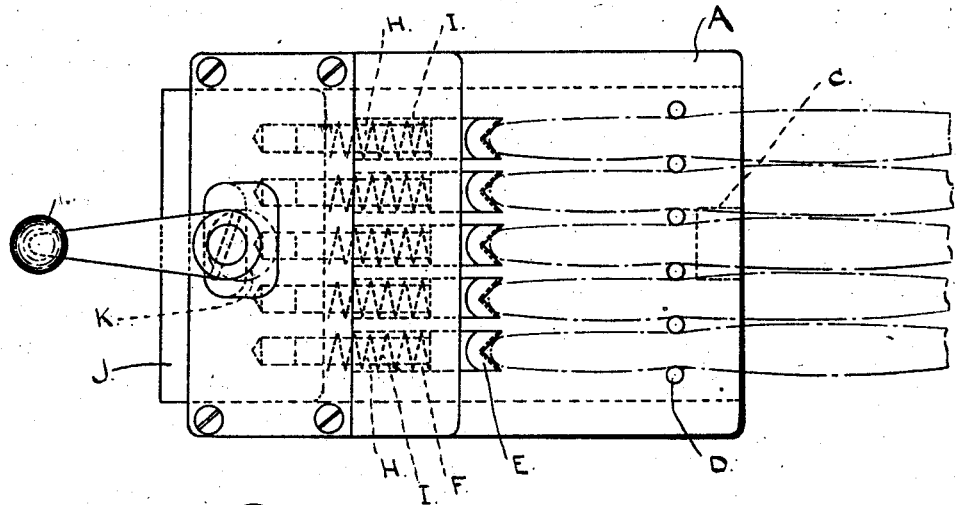
Figure 4 is a plan view of one of the multiple or gang brush holders.
Figure 5:
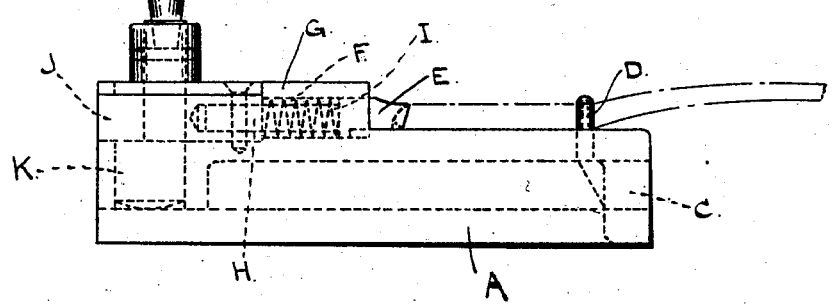
Figure 5 is a side elevation thereof.
Figure 6:
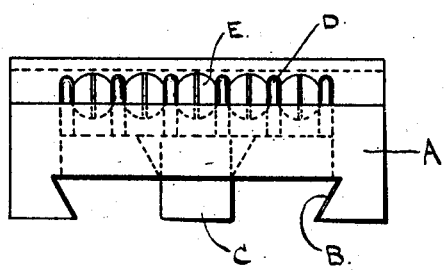
Figure 6 is an end elevation.

As shown in Figures 4, 5 and 6, A is a work holder which is formed with a dove-tailed guide-way B on its rear side for engaging corresponding ways on the machine to secure exact alignment. There is also the projecting lug C for engaging with cooperating bearings on the machine to secure an exact position longitudinally of the ways. D is a series of pins or lugs projecting from the front face of the holder A and forming shoulders for engagement with the shoulders on the brush backs formed by the contracted portion of the handle. E are clamping jaws, preferably of a V-shaped form, and also preferably under-cut, said jaws being adapted to engage the ends of the brush backs and to press the same against the pins or lugs D and against the face of the holder A. The jaws E slidably engage recesses F in a guide-way G secured to the front of the holder and each jaw has the reduced shank H, which is surrounded by a spring I. All of these springs abut against a movable block J, which is actuated by a cam or eccentric K and a handle L to increase or diminish the compression of the spring. The arrangement is such that when the cam retracts the block J, the tension of the springs is only sufficient to hold the brush backs lightly against the pins D, so that the individual backs may be easily sprung into engagement with the holder. When, however, the tension is increased by the movement of the block J, the pressure is sufficient to firmly hold the brush backs in position during all of the subsequent operations.

The operations of boring the brush backs and setting the tufts are accomplished in the same machine and respectively upon backs clamped in different holders. These holders are mounted in a common carrier M to which is imparted an intermittent movement for passing successively through a series of positions of registration. The carrier M is laterally slidably secured upon horizontal ways M' on a vertically movable carrier N, which latter is slidable on the vertical ways N' on a stationary frame O. These two carriers are respectively actuated by rotary cams P and P' through the medium of vertical slides Q and Q' and connecting mechanism. The slides Q and Q' are mounted in a vertical guideway R and the slide Q directly actuates the carrier N to raise the same, the return movement being effected by gravity. The slide Q' is connected by a bell crank lever S and a link T to one end of the slide M. Thus by properly fashioning the cams P and P' the slides M and N may be moved to carry the work holders through the desired series of positions.

Figure 1:
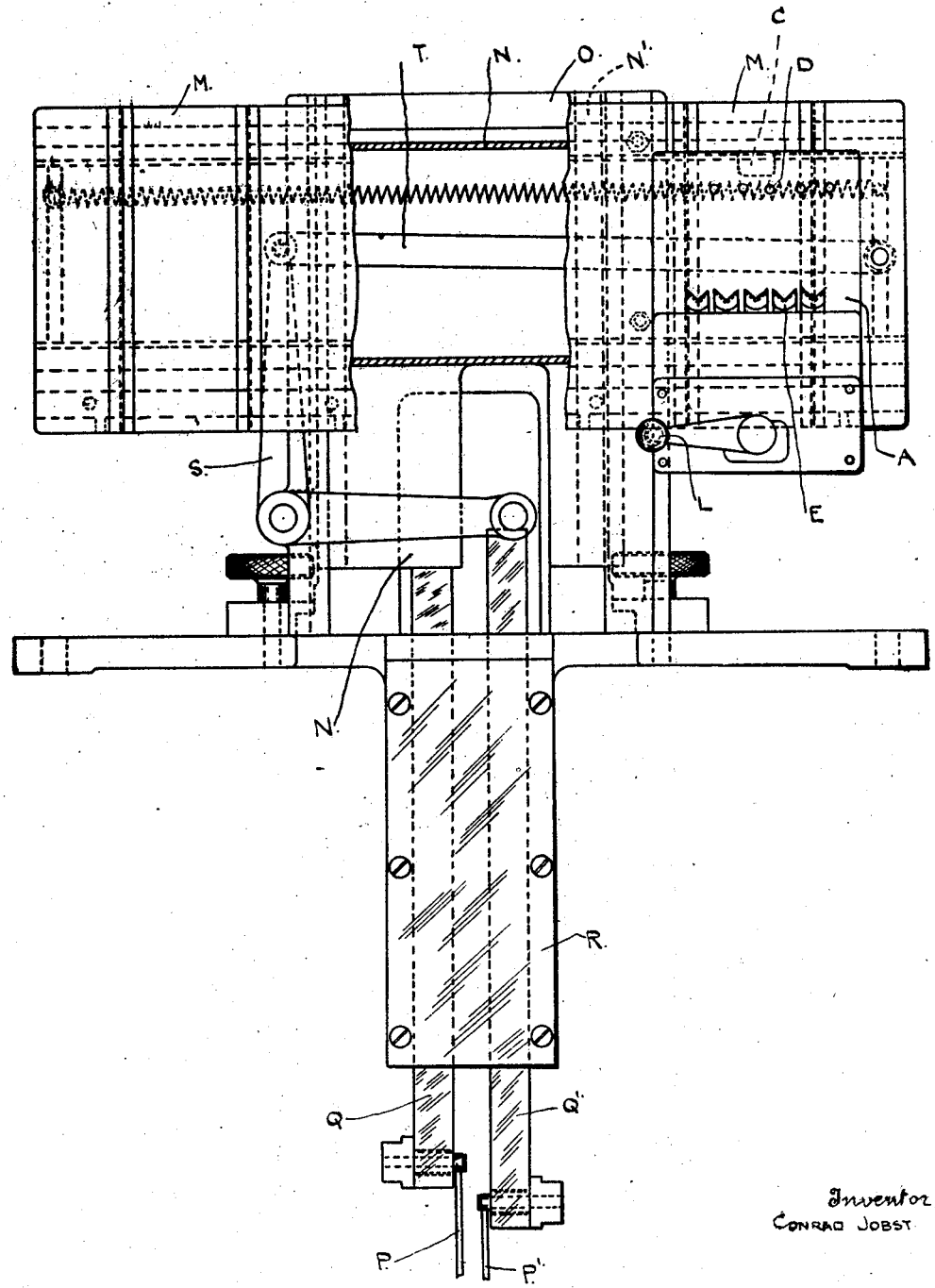
Figure 1 is a front elevation of the work holder for the boring and tuft setting machine.
Figure 2:
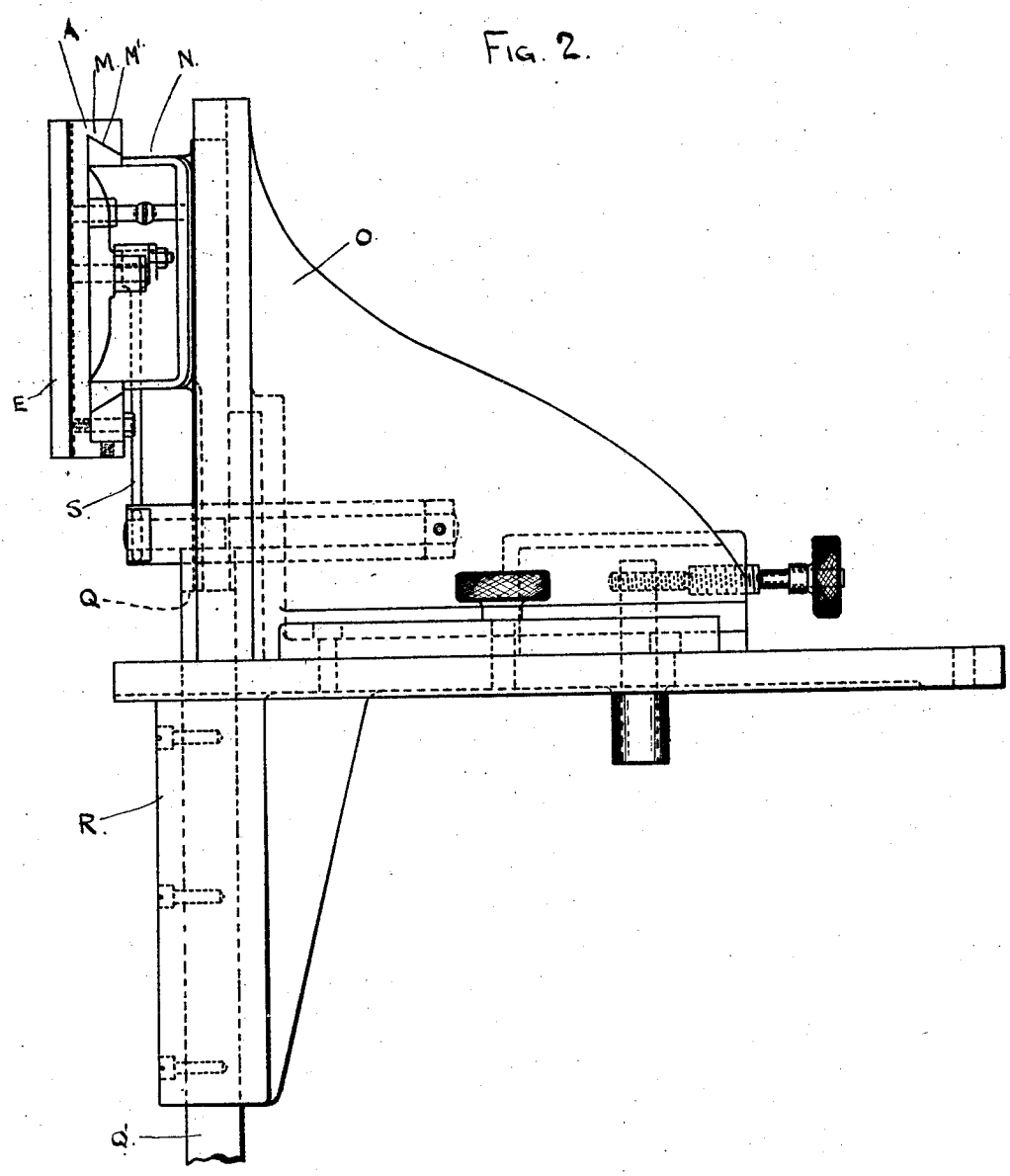
Figure 2 is a side elevation thereof.
Figure 3:
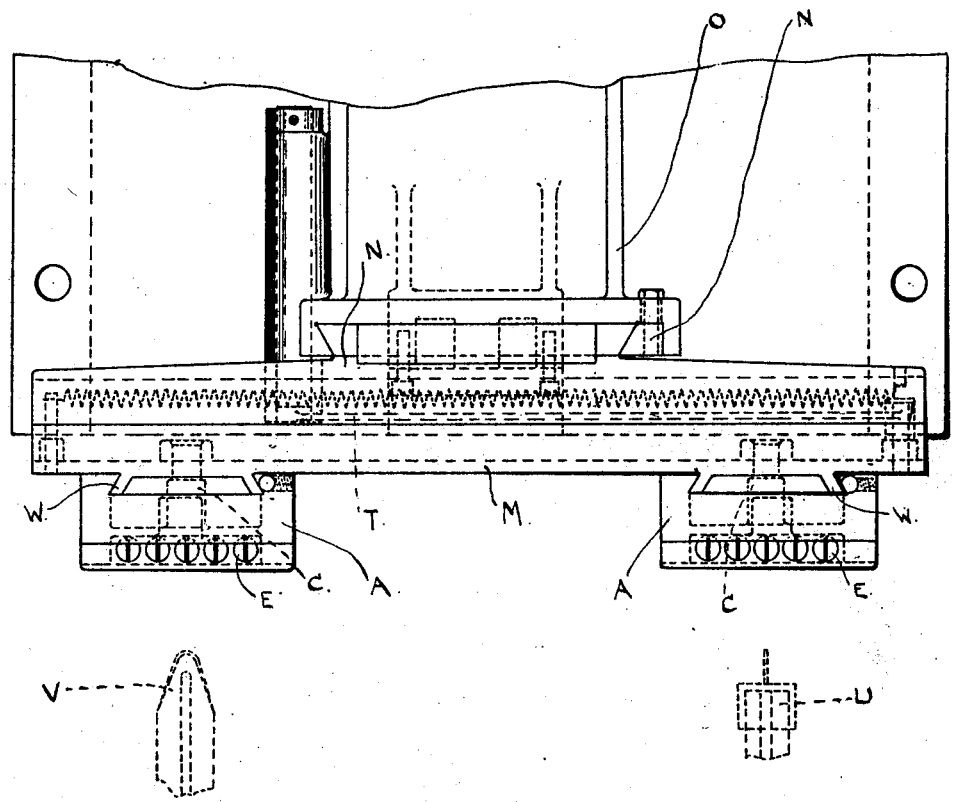
Figure 3 is a plan view.

The boring and tuft setting mechanisms which cooperate with the work holders may be of any suitable construction but, as diagrammatically shown in Fig. 3, U is the boring mechanism and V the tuft setting mechanism respectively registering with the two holders mounted on the carrier M. These holders are exactly positioned on guides W on the carrier so that when transferred from one set of guides to the other, they will be in exactly predetermined relation. In the operation of the machine the brush backs clamped in one holder are successively bored, the machine continuing its operation without interruption in passing from one brush back to the next adjacent one and so on throughout the series. Simultaneously the tufts are set in the corresponding positions of the brush backs in the other holder and upon the completion of the cycle all of the holes in one series of backs will have been bored, while all of the backs in the other series will have tufts set therein. The machine is then stopped, the holder removed from the tuft setting position, the holder having the bored backs is transferred and a new holder with unbored backs is placed in its position. This new holder can be filled with brush backs by the operator during the interval in which the machine is operating upon the previously filled holders, so that the interval in which the machine is out of action is very short. The holder with the tufted backs is then placed in the trimming machine, which preferably comprises a rotary trimming shear X and cooperating stationary shears X'. The holder is placed in engagement with guides Y on the carriage Y', and this carriage is then moved upon ways Z to bring the brushes successively into operation relative to the shearing mechanism.

In manufacturing brushes by the method above described, each individual brush back is held in an exactly predetermined relation to the several mechanisms which successively operate thereon so that the work is exactly performed. Also, production is greatly increased, for the operating mechanisms are maintained in action practically all of the time.

What I claim as my invention is:

1. In a brush making machine the combination of a reciprocable driller, a reciprocable tufter, carriers cooperating respectively with said driller and tufter, guideways on said carriers, a pair of interchangeable work holders having guides engaging the guideways on said carriers, means for securing a plurality of brush backs on each of said work holders, mechanism for imparting to each of said carriers step-by-step movements in transverse directions in the same plane, said movements being such that operations are successively performed in a continuous series on all of the brush backs in each of said work holders by said driller and tufter respectively.

2. In a brush making machine, the combination with a reciprocable driller and a reciprocable tufter, of a common carrier movable in a plane in transverse directions, guideways on said carrier adjacent the driller and tufter respectively, interchangeable work holders engaging each of said guideways, a series of clamps on each work holder arranged to independently secure thereto a series of brush backs in closely spaced relation, and mechanism for imparting to said carrier a step-by-step movement such that all of the brush backs in each of said work holders are operated upon in a continuous series.

3. In a brush machine, the combination with a simultaneously operating drilling and tuft setting mechanisms, of a work carrier movable in transverse directions in a plane in operative relation to said mechanisms, a plurality of work holders interchangeably engageable with said carrier in like relation to said drilling and tufting mechanisms respectively each holder adapted to secure a series of individual brush backs therein and means for imparting to said carrier a single cycle of step by step movements including the steps for all the operations on all of the backs in said holders.

In testimony whereof I affix my signature.

CONRAD JOBST.